J. W. CONNELY.
Wheel-Cultivator.
No. 62,185.  Patented Feb. 19, 1867.
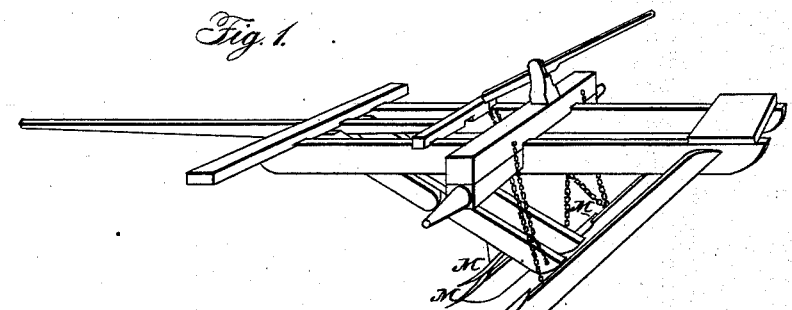
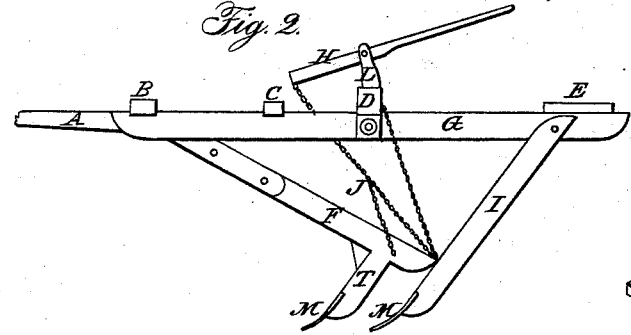
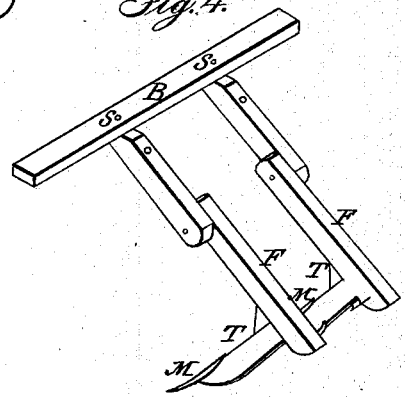
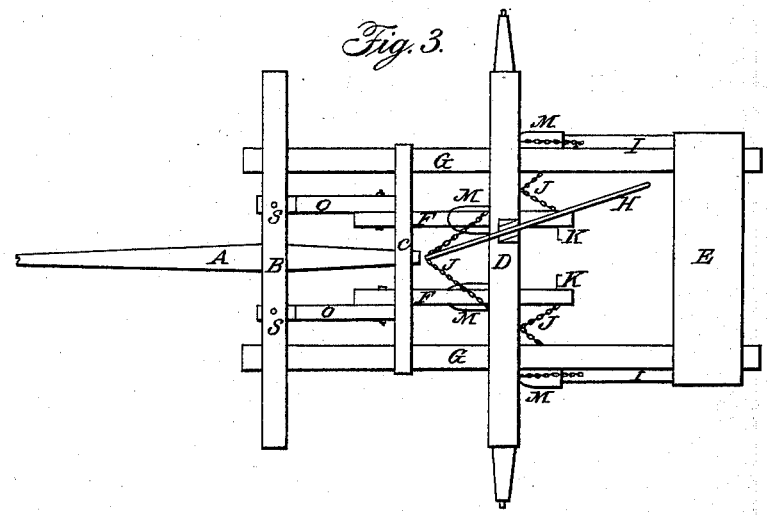
Witnesses:
Geo. H. Boyd
S. A. Shepard
Inventor:
J. W. Connely

United States Patent Office.

J. W. CONNELY, OF CHARLESTON, ILLINOIS.

*Letters Patent No. 62,185, dated February 19, 1867.*

IMPROVEMENT IN CULTIVATORS.

The Schedule referred to in these Letters Patent and making part of the same.

Be it known that I, J. W. CONNELY, of Charleston, Coles county, and State of Illinois, have invented a new and useful Machine for Cultivating Corn, Cotton, &c.; and I do hereby declare that the following is a full, clear, and exact description of the construction and operation of the same, reference being had to the annexed drawings, making a part of this specification.

Figure 1 is a perspective view.
Figure 2, side view.
Figure 3, top view.
Figure 4, view of interior section embracing middle ploughs or shovels with attachment.

The parts and members shown by letters, to wit: A, tongue; B, cross-bar or stationary double-tree; C, middle bar; D, axle; E, seat and rear bar; O O, arms; S S, pivot bolts; F F, beams; G G, hounds; H, lever; L, fulcrum; I I, plough stocks; J J, chains; K K, stirrups; M M, ploughs or shovels; T T, stocks of middle ploughs.

In order to enable others to make and use my invention, I will describe its construction and use, viz:

I use axle D, three feet seven inches long, three by three and one-half inches, with movable spindles sixteen and one-half inches in length, so as to make width of track vary at the pleasure of the operator; breadth from four feet to five feet; diameter of wheels five feet. Hounds G G, length five feet nine inches, size three by three and one-half inches, attached to the under side of axle D, running parallel with and twenty-two inches from each other. Bar B, length three feet ten inches, size two by three and one-half inches. This bar is let into hounds G G to the depth of one inch near the forward end and fastened with bolts; distance from bar B to axle D, twenty-five and one-half inches. Bar C, length two feet four inches, size two by two and one-half inches, distance from axle six and one-half inches, and let into hounds one inch; and bolted tongue A attached to under side of bars B and C. Seat or rear bar E, length two feet six inches, size one by twelve inches, distance from axle D twenty inches. Fulcrum L, length ten inches, size two by three inches, with two-inch tenon inserted in mortise in axle D; also mortise in top of fulcrum for reception of lever H, which said lever is three feet two inches long and one inch in diameter. Arms O O, length seventeen inches, size two by five inches, and attached to under side of bar B by pivot bolts S S. Beams F F, two feet nine and one-half inches in length, and two by three inches in size, and attached at lower end and inside of arms O O. Stocks T T, length twenty inches, size two by three inches, and mortised into beams F F, and supported by iron brace. Stocks I I, length two feet ten and one-half inches, and attached on outside of hounds G G, in rear of axle, two feet three and one-half inches; size of said stock two by three inches. Chains J J, attached to lever H and stocks I I and T T, also to axle D. Stirrups K K, inserted in stocks T T, twelve and one-half inches from bottom. Ploughs or shovels M M; size of inside ploughs six and one-half by nine inches; outside plough seven by eleven inches. Advantage of axle with movable spindle is to vary width of track, said spindle being bolted to axle, and movable. The attachment of arms O O by pivot bolts to bar B and beams F F, to arms O O by bolts or clevis making a flexible joint, giving middle ploughs a lateral and perpendicular or vertical movement by means of feet of operator, moving one or both at pleasure. And by use of lever H, all the ploughs or shovels are raised or lifted from the ground, making a light, durable, and convenient cultivator.

What I claim as my invention, and desire to secure by Letters Patent, is—

1. The machine in combination, in a cultivator, of the several parts, as arranged and described.
2. The arms O O made either of wood or iron, and manner and place of attachment to bar or double-tree on forward end of hounds of frame as described and shown.
3. Flexible joint, connecting beams F F with arms O O, either by bolts, pins, or clevis, as shown and described.
4. The bar B, arms O O, beams F F, and stocks T T, as constructed and shown and described.

J. W. CONNELY.

Witnesses:
J. W. DIKOB,
S. M. SHEPARD.